United States Patent
Pant et al.

(10) Patent No.: US 10,853,086 B2
(45) Date of Patent: Dec. 1, 2020

(54) INFORMATION HANDLING SYSTEMS AND RELATED METHODS FOR ESTABLISHING TRUST BETWEEN BOOT FIRMWARE AND APPLICATIONS BASED ON USER PHYSICAL PRESENCE VERIFICATION

(71) Applicant: DELL PRODUCTS L.P., Round Rock, TX (US)

(72) Inventors: Alok Pant, Austin, TX (US); Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 219 days.

(21) Appl. No.: 15/966,800

(22) Filed: Apr. 30, 2018

(65) Prior Publication Data
US 2019/0332392 A1    Oct. 31, 2019

(51) Int. Cl.
*G06F 21/62* (2013.01)
*G06F 9/4401* (2018.01)
*H04L 9/32* (2006.01)

(52) U.S. Cl.
CPC .......... *G06F 9/4406* (2013.01); *H04L 9/3213* (2013.01)

(58) Field of Classification Search
CPC .... G06F 9/4406; G06F 9/3271; G06F 21/575; G06F 21/00; G06F 21/31; H04L 9/3213; H04L 21/3217
USPC .......................................................... 726/27
See application file for complete search history.

(56) References Cited

U.S. PATENT DOCUMENTS

| | | | | |
|---|---|---|---|---|
| 7,185,190 B2* | 2/2007 | Rothman | ............ | G06F 9/4411 710/8 |
| 8,127,312 B2* | 2/2012 | Rothman | ............ | G06F 9/4401 713/164 |
| 8,561,138 B2* | 10/2013 | Rothman | ............ | G06F 21/34 726/2 |
| 9,235,710 B2* | 1/2016 | Jacobs | ............ | G06F 21/575 |
| 9,542,196 B2* | 1/2017 | Zhang | ............ | G06F 9/4411 |
| 9,690,596 B1* | 6/2017 | Chuang | ............ | G06F 9/441 |
| 2004/0193883 A1 | 9/2004 | Alperin et al. | | |
| 2007/0174600 A1 | 7/2007 | Williams et al. | | |

(Continued)

OTHER PUBLICATIONS

Adam W., "UEFI Boot: How Does That Actually Work, Then?", Jan. 2014, 20 pgs.

(Continued)

*Primary Examiner* — Amare F Tabor
(74) *Attorney, Agent, or Firm* — Egan Peterman Enders Huston (57) ABSTRACT

The present disclosure provides an information handling system (IHS) and related methods that use physical presence verification to establish unique trust relationships between boot firmware and one or more individual applications provided within an IHS. The IHS and methods disclosed herein provide secure verification of user physical presence by verifying the physical presence of a user during a pre-boot phase of the boot firmware (i.e., before an operating system (OS) is loaded and running). After user physical presence is verified during the pre-boot phase, the IHS and methods disclosed herein generate a physical presence (PP) bind token during OS runtime that may be used to establish a unique trust relationship between the boot firmware and one or more individual applications provided within the IHS.

20 Claims, 3 Drawing Sheets

(56) References Cited

U.S. PATENT DOCUMENTS

2008/0133794 A1* 6/2008 Rothman .............. G06F 3/0626
                                                    710/38
2009/0172712 A1   7/2009 Rothman et al.
2010/0115625 A1   5/2010 Proudler
2018/0091315 A1*  3/2018 Singhal ............... G06F 12/0676

OTHER PUBLICATIONS

Hoffman, "What Is UEFI, and How Is It Different From BIOS?", Nov. 2017, 4 pgs.
Wikipedia, "Pre-boot authentication", Dec. 16, 2016, 2 pgs.
TCG Published, "TCG PC Client Platform Physical Presence Interface Specification", Jul. 28, 2015, 69 pgs.
Wikipedia, "Trusted Platform Module", Apr. 28, 2018, 10 pgs.

* cited by examiner

INFORMATION HANDLING SYSTEMS AND RELATED METHODS FOR ESTABLISHING TRUST BETWEEN BOOT FIRMWARE AND APPLICATIONS BASED ON USER PHYSICAL PRESENCE VERIFICATION

FIELD

This invention relates generally to information handling systems, and more particularly, to methods for verifying the physical presence of a user at an information handling system and methods for establishing trust relationships between firmware and software components of an information handling system.

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often process and store confidential information and perform sensitive functions. Businesses and individuals often use a variety of security measures to protect sensitive information and functions from unauthorized use. For instance, information handling systems are typically protected from theft or unauthorized access by physical security and passwords. However, information handling systems that interact with a network may be subjected to malicious attacks launched from outside of the physical location of the information handling system. For example, hackers may use the Internet to launch malicious attacks on information handling systems from virtually anyplace. Although network security systems (such as firewalls) provide some protection from network-based malicious attacks, a determined hacker is often able to penetrate network security systems to obtain sensitive information or disrupt information handling system operations.

In an effort to improve security of information handling systems, the Trusted Computing Group developed the Trusted Platform Module (TPM) specification that defines security measures for information handling systems. One proposed security measure is to verify the physical presence a user of an IHS before allowing the user to access information or applications of the IHS. Verifying the physical presence of a user helps to prevent remote attacks launched through networks since the attacker generally does not have physical access to the attacked IHS. In the TPM specification, a key press during boot is used to verify TPM configuration changes and detect the physical presence of a user. One problem with this verification method is that normal input devices, such as keyboards, may be imitated through a remote attack and thus do not provide a secure method of user presence verification. Another problem with this verification method is that no trust relationship persists after the TPM configuration changes are confirmed.

Some applications included within an IHS may require verification of user physical presence before allowing access to certain computing resources of the IHS or allowing specific operations to be performed (such as, e.g., beginning encryption of a drive, securely wiping user hard drive contents, performing a critical thermal action, such as turning off a fan, or modifying a critical firmware setting, such as a hard disk password). These applications have typically "trusted" the operating system (OS) of the IHS to confirm a physically present user based on key press (e.g., requiring a user to type something on the keyboard) and OS credentials, such as Active Directory (AD) object/ownership. However, OS-based verification methods rely on application code, drivers and OS kernel hooks to detect and parse user input. These input handling procedures can easily be spoofed by exploiting OS and AD vulnerabilities, and do not provide hardware/platform verification of user presence.

SUMMARY OF THE INVENTION

The following description of various embodiments of information handling systems and related methods is not to be construed in any way as limiting the subject matter of the appended claims.

The present disclosure is directed to information handling systems (IHSs) and related methods that use physical presence verification to improve security of the IHS, for example, by helping to prevent remote attacks launched through networks. In general, the IHS and methods disclosed herein provide secure verification of user physical presence by verifying the physical presence of a user during a pre-boot phase of the boot firmware provided within an IHS. As used herein, the "pre-boot phase" (or pre-OS boot phase) is the duration of time between a system restart/reboot and the loading of an operating system (OS). Once user physical presence is verified during the pre-boot phase, the disclosed IHS and methods generate a physical presence (PP) bind token during OS runtime that may be used to establish a unique trust relationship between the boot firmware and one or more individual applications provided within the IHS.

According to one embodiment, an information handling system (IHS) in accordance with the present disclosure may generally include a computer readable storage medium storing an operating system (OS) and at least one application, a computer readable memory storing boot firmware including boot services and runtime services, and at least one processing device coupled to the computer readable storage medium and to the computer readable memory. The at least one processing device may be generally configured to execute a plurality of program instructions included within the boot firmware, during both a pre-boot phase of the boot firmware and during OS runtime. For example, the at least one processing device may execute a first set of program instructions included within the boot services of the boot firmware during a pre-boot phase of the boot firmware to interact with a user of the IHS and receive user input via an input device of the IHS. In addition, the at least one processing device may execute a second set of program instructions included within the runtime services of the boot firmware to verify a physical presence of the user during OS runtime. The verification of the physical presence of the user may be based on at least a subset of the user input received during the pre-boot phase.

In some embodiments, the user input received during the pre-boot phase may be selected from a group including: a key press on a keyboard or a touch screen, a swipe across the touch screen, a click/scroll on a mouse, a string of one or more characters entered on the keyboard or the touch screen, and a challenge string entered on the keyboard or the touch screen, wherein the challenge string was previously displayed to the user and included within the application token provided to the boot firmware.

In some embodiments, the first set of program instructions executed by the at least one processing device during the pre-boot phase may display a text command on a display screen of the IHS requesting the user to enter the user input via the input device of the IHS. In such embodiments, the second set of program instructions executed by the at least one processing device during OS runtime may verify the physical presence of the user if the user input received during the pre-boot phase matches user input requested in the text command.

In some embodiments, the at least one application may include a third set of program instructions, which may be executed by the at least one processing device during OS runtime to generate an application token unique to that application and provide the application token to the boot firmware. In some embodiments, the application token may include one or more of the following: one or more keys associated with the at least one application, a plain text or hash of a challenge string displayed to the user of the IHS, a random number generated by the at least one application, a random number generated by the boot firmware and forwarded to the at least one application, and one or more access requests associated with the application.

In some embodiments, the runtime services of the boot firmware may include a fourth set of program instructions, which may be executed by the at least one processing device during OS runtime to generate a boot firmware token if the physical presence of the user is verified. In some embodiments, the boot firmware token may include one or more of the following: one or more keys associated with the boot firmware, a random number generated by the boot firmware, a random number generated by the at least one application, and a status of permissions granted and/or denied for one or more access requests associated with the application.

In some embodiments, the at least one application may include a fifth set of program instructions, which may be executed by the at least one processing device during OS runtime to receive the boot firmware token if the physical presence of the user is verified, open a secure communication tunnel between the boot firmware and the at least one application, generate a physical presence (PP) bind token including at least a subset of information included within the application token and the boot firmware token, and provide the PP bind token to the boot firmware.

In some embodiments, the runtime services of the boot firmware may include a sixth set of program instructions, which may be executed by the at least one processing device during OS runtime to establish a trust relationship between the boot firmware and the at least one application using the PP bind token.

According to another embodiment, a method is provided herein for generating a trust relationship between boot firmware and at least one application stored within an information handling system (IHS). In general, the method disclosed herein may include providing an application token unique to the at least one application to the boot firmware, storing the application token, and subsequently rebooting the IHS to enter a pre-boot phase of the boot firmware. During the pre-boot phase, the method may prompt the user to provide user input and receive the user input via an input device of the IHS. After an operating system (OS) is loaded and running in the IHS (i.e., during OS runtime), the method may verify a physical presence of the user based on at least a subset of the user input received during the pre-boot phase.

In some embodiments, prior to providing the application token, the method may further include generating the application token, where the application token includes at least one application access request and a challenge string that was previously displayed to the user. In such embodiments, said verifying may include comparing the received user input to the challenge string included within the application token to verify the physical presence of the user.

In some embodiments, the disclosed method may prompt the user to provide user input during the pre-boot phase by prompting the user to provide the challenge string that was previously displayed to the user and grant permission(s) for the at least one application access request included within the application token. In some embodiments, the user input received via an input device of the IHS during the pre-boot phase may include a user response to the challenge string and any permissions granted by the user.

The method disclosed herein may perform additional steps if the physical presence of the user is verified. For example, the disclosed method may generate a boot firmware token and open a secure communication tunnel between the boot firmware and the at least one application if the physical presence of the user is verified. In some embodiments, the method may generate a physical presence (PP) bind token including at least a subset of information included within the application token and the boot firmware token. After the PP bind token is generated, the method may establish a trust relationship between the boot firmware and the at least one application using the PP bind token. In some embodiments, the PP bind token may include any permissions that were granted by the user during the pre-boot phase. Once the trust relationship is established using the PP bind token, the method may perform application access(es) per the permission(s) included within the PP bind token.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Figure 1:
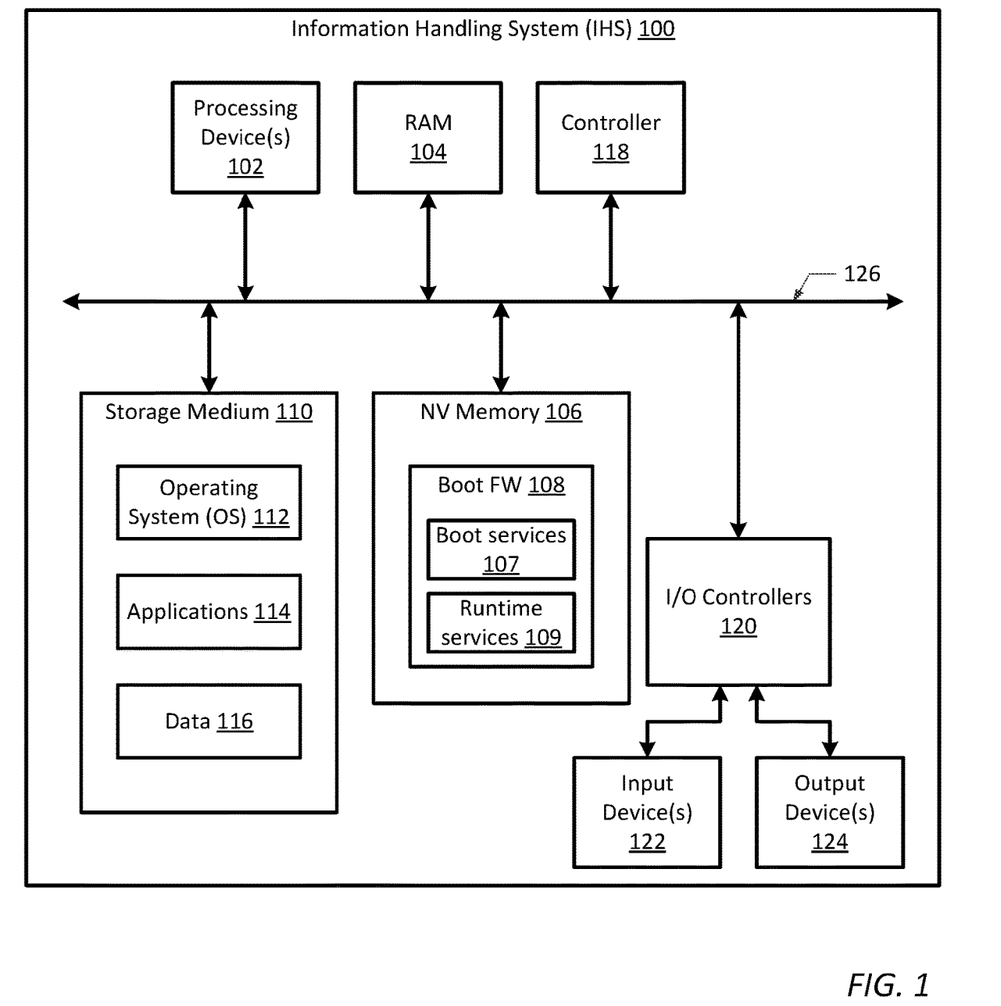
FIG. 1 is a block diagram illustrating an information handling system (IHS), according to one embodiment of the present disclosure.

FIG. 1 is a block diagram of an information handling system (IHS) 100 as it may be configured according to one embodiment of the present disclosure. In this regard, it will be understood that the IHS configuration shown in FIG. 1 is exemplary only, and that the disclosed methods may be implemented on any type of information handling system. It will be further understood that while certain components of the information handling system are shown in FIG. 1 for illustrating embodiments of the present disclosure, the information handling system disclosed herein is not restricted to including only those components shown in FIG. 1 and described below.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Turning to FIG. 1, information handling system (IHS) 100 may generally include one or more processing devices 102 coupled to one or more computer readable memory or storage medium devices via a system interconnect 126. In the embodiment of FIG. 1, IHS 100 includes random access memory (RAM) 104, at least one computer readable memory 106 and at least one computer readable storage medium 110. Other components of IHS 100, such as controller 118 and input/output (I/O) controllers 120 may also be coupled to system interconnect 126 for communicating signals and data there between. The system interconnect 126 depicted in FIG. 1 may represent one or more buses, interfaces, hubs and/or controllers used to transfer information between the system components. Other components not specifically shown in FIG. 1 may also be included within the information handling system.

Computer readable memory 106 may be generally configured to store a plurality of software and/or firmware modules, and may include any type of non-volatile memory including, but not limited to, read-only memory (ROM), flash memory, and non-volatile random access memory (NVRAM). The software and/or firmware modules stored within computer readable memory 106 may contain program instructions (or computer program code), which may be executed by processing device(s) 102 or controller 118 to instruct components of IHS 100 to perform various tasks and functions for the information handling system. For example, computer readable memory 106 may contain boot firmware (FW) 108, such as a Basic Input/Output System (BIOS) or a Unified Extensible Firmware Interface (UEFI). Boot firmware 108 may generally include software and/or firmware modules for specifying hardware configuration settings, system time and boot sequence. When IHS 100 is powered on or rebooted, program instructions within boot firmware 108 may be executed by processing device(s) 102 or controller 118 to configure hardware components of the IHS, perform a Power-On Self-Test (POST) to ensure the hardware configuration is valid and working properly, and launch a bootloader to boot at least one operating system (OS) 112 of the IHS.

Boot firmware 108 may include boot services 107 and runtime services 109. Boot services 107 are available for execution only when the boot firmware 108 owns the platform during the early boot or pre-boot phase of the boot firmware before the OS is loaded and running. Examples of boot services 107 typically provided within boot firmware 108 include, but are not limited to, text and graphical consoles, and bus, block and file services. Runtime services 109, on the other hand, are available for execution while the OS is running. Examples of runtime services 109 typically provided within boot firmware 108 include, but are not limited to, date/time configuration settings and access to non-volatile memory. As set forth in more detail below, boot firmware 108 may include additional boot services 107 and/or runtime services 109, which may be executable to perform various steps of the methods disclosed herein.

Computer readable storage medium 110 may be generally configured to store at least one operating system (OS) 112 for the IHS, in addition to one or more applications 114 and (optionally) user data 116. Computer readable storage medium 110 may be any type of persistent, non-transitory computer readable storage medium, such as one or more hard disk drives (HDDs) or solid-state drives (SSDs).

When the IHS is powered on or rebooted, a boot loader within boot firmware 108 is executed to retrieve OS 112 from computer readable storage medium 110 and load it into RAM 104. Once loaded into RAM 104, program instructions (or computer program code) within OS 112 may be executed by processing device(s) 102 to perform various tasks and functions for the information handling system. The one or more application(s) 114 stored within computer readable storage medium 110 may also contain program instructions, which may be executed by processing device(s) 102 and/or controller 118 to perform various tasks and functions for the information handling system and/or for the user. In some embodiments, OS 112 or application(s) 114 may include additional program instructions (referred to herein as "application code"), which may be executable to perform various steps of the methods disclosed herein.

Processing device(s) 102 may be generally configured to execute program instructions stored within RAM 104, computer readable memory 106 and/or computer readable storage medium 110. Examples of processing device(s) 102 include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.).

According to one embodiment, processing device(s) 102 may include a central processing unit (CPU), which is coupled and configured to execute program instructions associated with boot firmware 108, OS 112, and/or applications 114. The CPU may include any type of processor or processing device, such as an Intel Pentium series processor, an Advanced Micro Devices (AMD) processor or another processing device. In some embodiments, processing device(s) 102 may include other types of processing devices including, but not limited to, a graphics processor unit (GPU), a graphics-derivative processor (such as a physics/gaming processor), a digital signal processor (DSP), etc.

Controller 118 may be generally configured to execute program instructions stored within computer readable memory 106 and/or computer readable storage medium 110. According to one embodiment, controller 118 may be configured to execute program instructions associated with boot firmware 108 and/or applications 114. Controller 118 may be implemented in hardware, software and/or firmware, and in some embodiments, may be an embedded controller (EC) or a dedicated microcontroller provided, for example, on a trusted platform of the IHS.

I/O controllers 120 may be generally configured to control communication of data and signals between components of IHS 100 and the input device(s) 122 and output device(s) 124 attached or otherwise coupled thereto. For example, one or more I/O controller(s) 120 may be included within IHS 100 to provide a physical connection to, and process signals from, one or more input devices 122, such as a keyboard, mouse, touch screen, touch pad, microphone, biometric scanner, etc. In addition, one or more I/O controller(s) 120 may be included within IHS 100 to provide a physical connection, and forward output signals to, one or more output devices 124, such as a computer monitor, display device, audio speaker(s), etc.

As noted above, physical presence verification is a method commonly used in information handling systems to improve security of the IHS, for example, by helping to prevent remote attacks launched through networks. While many different methods have been proposed, the current methods that exist for verifying the physical presence of a user have several drawbacks or disadvantages. To overcome these deficiencies, an information handling system and related methods are provided herein to provide secure verification of user physical presence by verifying the physical presence of a user during a pre-boot phase of the boot firmware provided within the IHS. Once user physical presence is verified, the IHS and related methods disclosed herein generate a physical presence (PP) bind token, which is used to establish a unique trust relationship between the boot firmware and one or more individual applications provided within the IHS.

Figure 2:
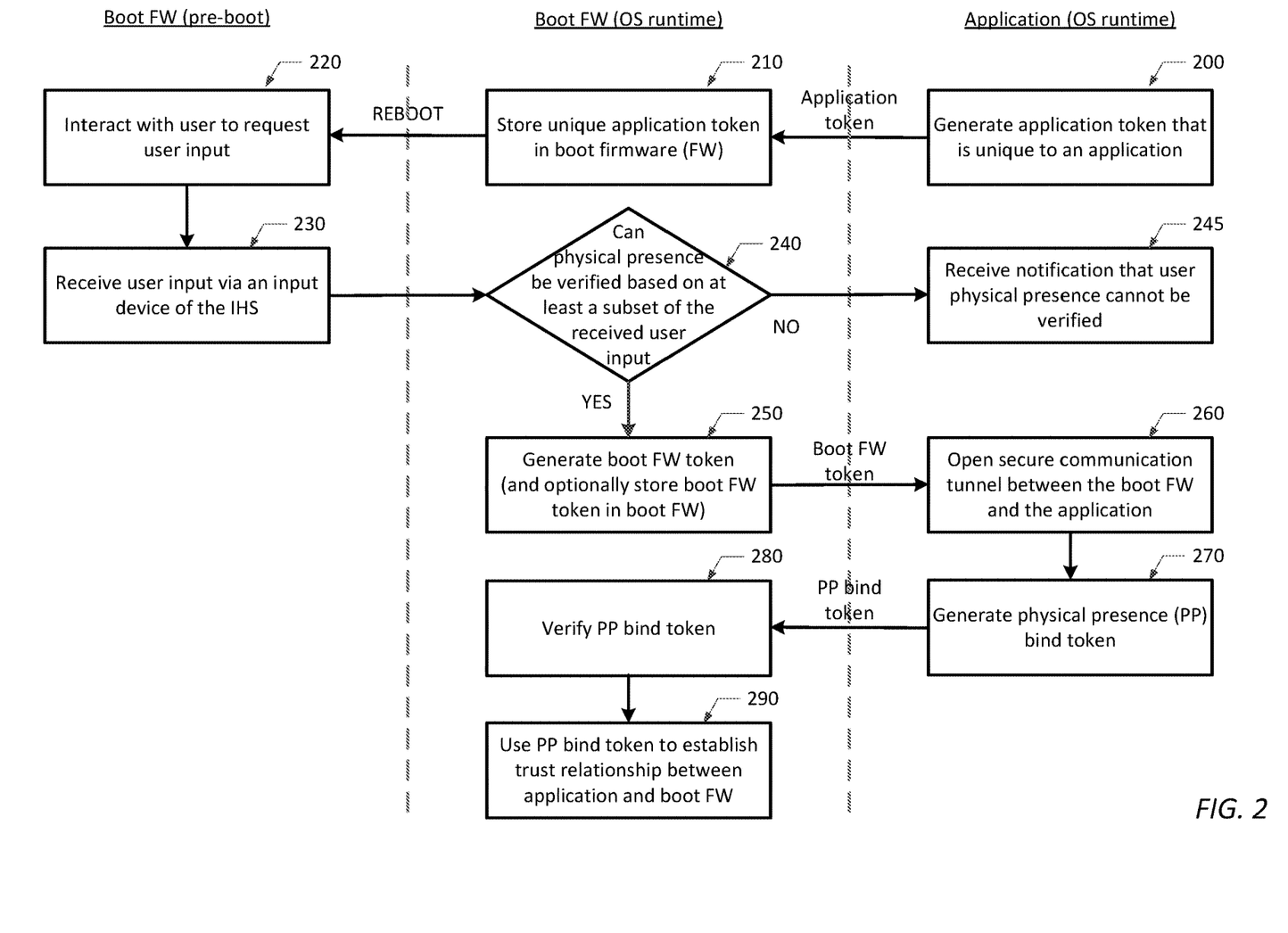
FIG. 2 is a flowchart diagram illustrating one embodiment of a method to establish a trust relationship between boot firmware and one or more applications provided within an IHS based on verification of user physical presence obtained during a pre-boot phase of the boot firmware.
Figure 3:
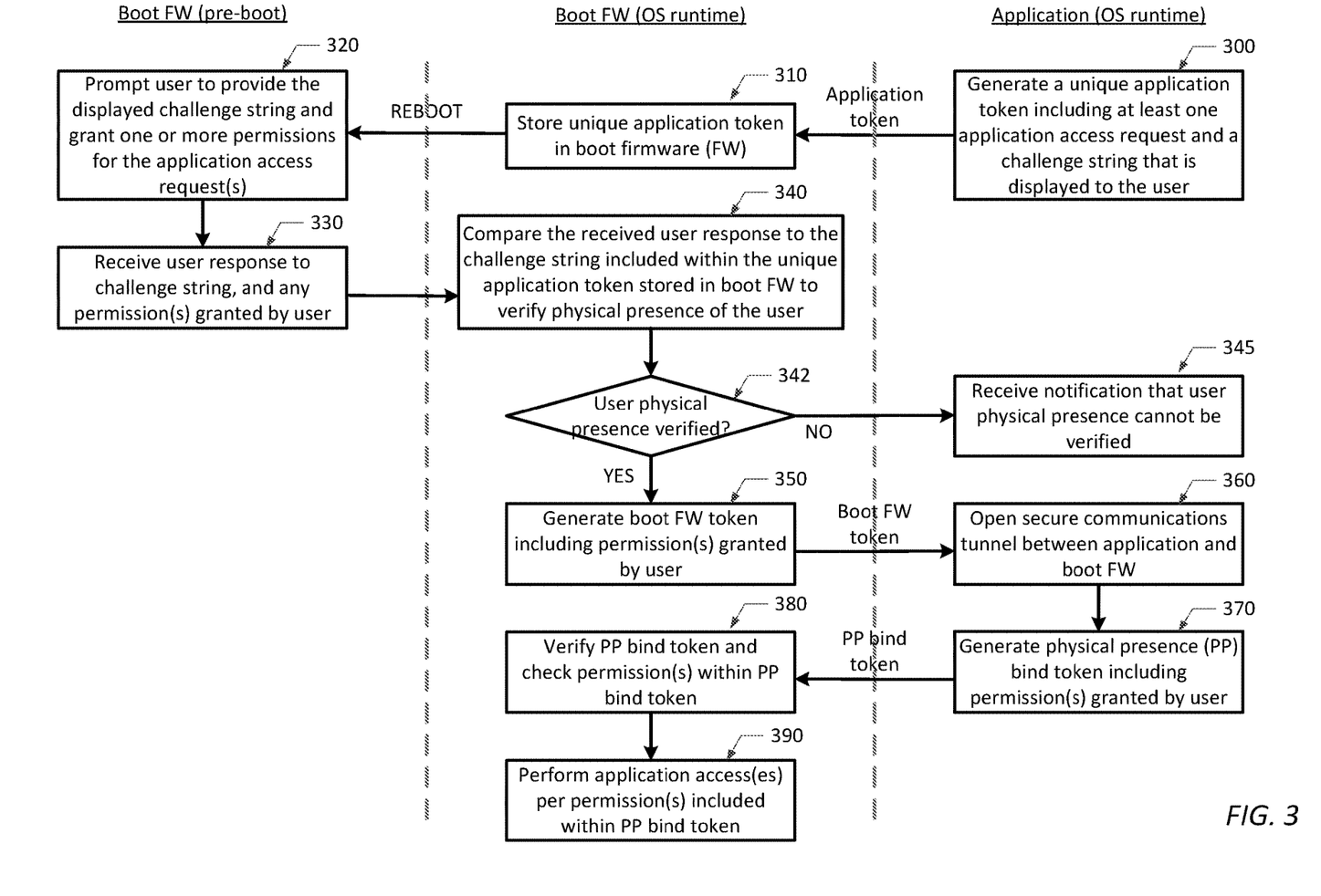
FIG. 3 is a flowchart diagram illustrating another embodiment of a method to establish a trust relationship between boot firmware and one or more applications, wherein the trust relationship specifies permission(s) granted by the user during the pre-boot phase for performing one or more application access requests.

FIGS. 2 and 3 illustrate various embodiments of the methods disclosed herein. In the disclosed methods, a unique trust relationship is established between the boot firmware (e.g., boot firmware 108) and one or more individual applications (such as, e.g., one or more of applications 114) based, in part, on the secure verification of user physical presence. As such, each application requesting verification of user physical presence may initiate an instance of the methods shown and described herein to establish a unique trust relationship between that application and the boot firmware.

In the flowchart diagrams shown in FIGS. 2 and 3, the disclosed method steps are illustrated as being performed via execution of: (a) application code executed during OS runtime, (b) boot firmware (FW) code executed during OS runtime, and (c) boot FW code executed during a pre-boot phase of the boot firmware. The application code and boot FW code depicted in FIGS. 2 and 3 may generally comprise program instructions, which are stored within a computer readable storage medium and/or a computer readable memory of an information handling system and executed by a processing device or controller of the IHS.

According to one embodiment, the application code represented in method steps 200/300, 245/345, 260/360 and 270/370 may be stored within OS 112 or applications 114 of computer readable storage medium 110, and may be executed by processing device(s) 102 or controller 118 of IHS 100 during OS runtime. In addition, the boot FW code represented in method steps 210/310-240/342, 250/350, 280/380 and 290/390 is stored within boot firmware 108 of computer readable memory 106, and executed by processing device(s) 102 or controller 118 during OS runtime or during a pre-boot phase of the IHS. Specifically, the boot FW code represented in method steps 220/320 and 230/330 may be executed during the pre-boot phase of boot firmware 108 before the OS 112 is loaded by the boot firmware, while method steps 210/310, 240/340/342, 250/350, 280/380 and 290/390 are executed when OS 112 is running. In some embodiments, the boot FW code executed during the pre-boot phase may be a boot service 107 of boot firmware 108, and the boot FW code executed during OS runtime may be a runtime service 109 of boot firmware 108.

FIG. 2 is a flowchart diagram illustrating one embodiment of a method that may be used to establish a unique trust relationship between the boot firmware and one or more individual applications of an information handling system based on a secure verification of user physical presence. In the embodiment of FIG. 2, the method begins when an application generates an application token (in step 200) that is unique to that application. The application token generated in step 200 may include substantially any information or aggregation of information. For example, the application token may include one or more keys associated with the application (such as, e.g., a public key obtained from a digital certificate provisioned for the application), a plain text or hash of a challenge string displayed to a user of the IHS, a random number generated by the application, and/or a random number generated by the boot firmware and forwarded to the application. In some cases, the application token may include one or more of the information pieces described herein and may be encrypted and/or signed, e.g., with a private key obtained from the digital certificate provisioned for the application.

In some embodiments, the application token generated in step 200 may also include one or more access requests associated with the application. As used herein, an "application access request" is a request made by an operating system application within operating system to access one or more computing resources of, or information stored within, an information handling system. For example, an application access request may request access to, or control of, an input device 122 (e.g., a keyboard, touch screen, microphone or camera, etc.) or an output device 124 (e.g., a display device, audio speaker, etc.) of the IHS. Other application access requests may request access to computer readable memory 106, computer readable storage medium 110 and/or the firmware, software and/or data stored therein.

In some embodiments, an application access request may request boot firmware 108 or OS 112 to perform some task. For example, an application access request may request boot firmware 108 to wipe or delete the contents of one or more hard disk drives (e.g., the application may request a BIOS Data Wipe for one or more hard disk drives) included within the IHS. In another example, an application access request may request OS 112 to encrypt/decrypt at least a subset of the data 116 stored within computer readable storage medium 110. In yet another example, an application access request may request boot firmware 108 or OS 112 to modify a critical platform configuration such as, for example, a hard disk controller mode, trusted platform module (TPM) chip changes, network access configuration, battery charging methods, etc. In some cases, the application access requests provided to modify a critical platform configuration can be divided into several levels of privileges, such as modification to hardware configuration, modification to the platform feature behavior, control access to critical platform operation, administrative level control, etc.

In step 210, the unique application token is provided to the boot firmware and stored in computer readable memory. In one embodiment, the unique application token may be stored in computer readable memory 106 via a UEFI variable write service, which is a runtime service 109 of the boot firmware 108 that enables non-volatile data to be stored and shared between the boot firmware and OS 112. In some embodiments, the IHS may be rebooted ("REBOOT") after a unique application token is stored in step 210 to restart the IHS and enter a pre-boot phase of the boot firmware 108. In other embodiments, the IHS may be rebooted sometime after a number of unique applications tokens generated by a plurality of different applications in step 200 are stored in step 210. In such embodiments, the application tokens may be placed in a queue and addressed separately in subsequent method steps performed during the pre-boot phase.

When an IHS is rebooted, RAM 104 is cleared to zero, hardware components of the IHS are reset and tested for proper functioning, and a small computer program (known as a boot loader) stored within boot firmware 108 is executed by a processing device 102 (e.g., a CPU) of the IHS to load an operating system 112 into RAM 104. Upon booting (or rebooting), the CPU (or another processing device) executes the first instruction located at the reset vector, i.e., the pointer or address pointing to the boot firmware 108 entry point inside computer readable memory 106. This memory location typically contains a jump instruction that transfers execution to the location of the boot firmware start-up program, which in the case of a hard boot, may run a Power-On Self-Test (POST) to check and initialize hardware components of the IHS. After initializing hardware components, the boot firmware may go through a pre-configured list (i.e., a "boot sequence") of one or more computer readable storage mediums 110 until it finds one that is bootable. Once the boot firmware finds a bootable device, it loads the boot sector of the computer readable storage medium into RAM 104 and executes the boot sector code. The main function of the boot sector code is to load and execute the operating system kernel, which continues startup by loading at least one operating system 112 into RAM 104. Booting is complete when an operating system 112 is loaded and the normal, operative, runtime environment is attained.

As used herein, the pre-OS boot phase (or simply "pre-boot phase") is the duration of time between a system restart/reboot and the loading of an operating system 112. During the pre-boot phase, the boot firmware 108 has control of the platform and the smallest amount of code is running in the Trusted Computing Base (TCB) of the IHS. In other words, the configuration of the IHS returns to a more trusted, secure environment during the pre-boot phase of the boot firmware 108.

In step 220, a boot service 107 within boot firmware 108 may interact with a user of the IHS to request user input during the pre-boot phase of the boot firmware. The boot service may interact with the user in a variety of different ways and may request a variety of different types of user input. In one embodiment, the boot service may display a text command on a display screen of the IHS asking the user to enter some form of input via an input device of the IHS, such as a keyboard, touch screen, touch pad, microphone, biometric scanner, etc. In some cases, the requested input may be as simple as a key press on a keyboard or touch screen, a click/scroll on a mouse, or a swipe across a touch screen.

In other cases, the text command may prompt the user to input a string of one or more characters on a keyboard or touch screen. The requested character string may be substantially any alphanumeric string, such as a user password, a user name, a string of numbers (e.g., "1234") or a phrase (e.g., "my name is Bill"). In some cases, the text command may prompt the user to enter the challenge string, which was previously displayed to the user and included within the application token in step 200 before the IHS was rebooted.

In step 230, a boot service 107 within boot firmware 108 may receive user input via an input device of the IHS. The manner in which the user input is received in step 230 is generally dependent on the input device used to provide the user input. For example, if the user provided user input via a keyboard coupled to the IHS, an I/O controller 120 coupled to the keyboard may forward the user input to the processing device 102 or controller 118 executing the boot service.

In some embodiments, a boot service 107 within boot firmware 108 may display a text command on a display screen of the IHS asking the user to grant permission for one or more application access requests in step 220, and may receive granted permission(s) in step 230. As noted above, the application access request(s) may be included within one or more unique application tokens, which were previously provided by one or more individual applications and stored within the boot firmware in step 210. If more than one unique application token is stored in step 210, the application tokens may be queued, and the application access request(s) contained within each token may be individually addressed in steps 220 and 230.

In step 240, a runtime service 109 within boot firmware 108 may determine if the physical presence of a user can be verified during OS runtime based on at least a subset of the user input received by the boot service 107 (in step 230) during the pre-boot phase. In some cases, the runtime service 109 may verify user physical presence (YES branch of step 240) if any form of user input was received in step 230 via one or more input devices of the IHS. In other cases, user physical presence may be verified (YES branch of step 240) only if the input specifically requested in step 220 was received in step 230 via an input device of the IHS. If the physical presence of a user cannot be verified (NO branch of step 240), the boot firmware may notify or inform the application that user physical presence could not be verified (in step 245). Alternatively, the method shown in FIG. 2 may end after failing to verify user physical presence without notifying the application.

In step 250, a runtime service 109 within boot firmware 108 may generate a boot firmware token if user physical presence is verified in step 240. In some embodiments, the boot firmware token generated in step 250 may be stored within the boot firmware. In one example, the boot firmware token may be stored in computer readable memory 106 via a UEFI variable write service. In some embodiments, more than one boot firmware token may be generated (and optionally stored) in step 250 if more than one unique application token was stored in step 210 and user physical presence is verified in step 240. Once generated, the boot firmware token(s) generated in step 250 may be provided to the application(s) and used to open a secure communication tunnel between the boot firmware and the application(s) in step 260.

In some embodiments, it may not be necessary to store the boot firmware token(s) generated in step 250. In one example, the boot firmware may generate a random number, sign the random number using a private key, and send this signed boot firmware token to an application. Although the application cannot decrypt the signed boot firmware token, the application may store the signed boot firmware token and, on every operation, send the signed boot firmware token to the boot firmware to decrypt.

The boot firmware token(s) generated in step 250 may include substantially any information or aggregation of information. For example, a boot firmware token may include a public key associated with the boot firmware, a random number generated by an application, and/or a random number generated by the boot firmware. In some embodiments, the boot firmware token may include a status (e.g., granted or denied) of the application access request(s) displayed to the user in step 220, or a list of the permissions granted in step 230. In some cases, a boot firmware token may include one or more of the information pieces describe above and may be encrypted and/or signed, e.g., with a private key associated with the boot firmware.

In step 270, the application generates a physical presence (PP) bind token that represents a physical presence binding operation between the boot firmware and the application. The PP bind token generated in step 270 may include at least a subset of the information included within the application token generated in step 200 and the boot firmware token generated in step 250 and provided to the application. For example, the PP bind token may include one or more of the following pieces of information obtained from the application and boot firmware tokens: a public key associated with the application, a public key associated with the boot firmware, a random number generated by the application, a random number generated by the boot firmware, and a plain text or hash of a challenge string displayed to the user of the IHS. In some embodiments, the PP bind token may also include a status (e.g., granted or denied) of the application access request(s) pertaining to the application, or a list of the permission(s) granted for the application. Sometime after it is generated, the PP bind token may be provided to the boot firmware and used as a unique physical presence binding handle between the boot firmware and the application.

In step 280, a runtime service 109 within boot firmware 108 may verify the PP bind token. In some embodiments, the PP bind token may be verified by comparing at least a subset of the information included within the application token generated in step 200 and the boot firmware token generated in step 250. In some embodiments, the PP bind token may be verified by encrypting the PP bind token with a shared secret or asymmetric keys shared between the boot firmware and a particular application, so that no other application can perform a replay attack. Once verified, information within the PP bind token may be used in step 290 to establish a unique trust relationship between the boot firmware and the application. In some embodiments, a runtime service 109 within boot firmware 108 may allow or perform the application access(es) for which permission was granted and included within the PP bind token.

FIG. 3 is a flowchart diagram illustrating another embodiment of a method that may be used to establish a unique trust relationship between the boot firmware and one or more individual applications of an information handling system based on a secure verification of user physical presence. Compared to the embodiment shown in FIG. 2, FIG. 3 illustrates an embodiment of the present disclosure in which user physical presence is verified by comparing information displayed to the user during OS runtime to a response received from the user during a pre-boot phase of the IHS. In addition, the embodiment shown in FIG. 3 establishes a trust relationship between the boot firmware and one or more individual applications, wherein the trust relationship specifies permission(s) granted by the user during the pre-boot phase for performing one or more application access requests.

In the embodiment of FIG. 3, the method begins when an application generates an application token (in step 300) that is unique to that application. While the application token may include substantially any information or aggregation of information, the application token generated in step 300 of FIG. 3 includes at least one application access request, in addition to a challenge string, which is displayed to the user by the application during OS runtime. The application token generated in step 300 may also include one or more additional pieces of information, as set forth above. Examples of application access requests and challenge strings are described in more detail above. In some embodiments, a unique application token may be generated by one or more individual applications in step 300 and provided to the boot firmware.

In step 310, the unique application token(s) generated in step 300 are stored in computer readable memory. In one embodiment, the unique application token(s) may be stored in computer readable memory 106 via a UEFI variable write service, as noted above. In some embodiments, the IHS may be rebooted ("REBOOT") after a unique application token is stored in step 310 to restart the IHS and enter a pre-boot phase of the boot firmware 108. In other embodiments, a number of unique application tokens generated by a plurality of different applications may be queued in step 310 before the IHS is rebooted to enter the pre-boot phase of boot firmware 108.

During the pre-boot phase, a boot service 107 within boot firmware 108 may prompt a user of the IHS (in step 320) to enter the challenge string that was previously displayed to the user during OS runtime. In addition, the boot service may prompt the user to grant one or more permissions for the application access request(s) included within each unique application token in step 320. In one embodiment, the boot service may display a text command on a display screen of the IHS prompting the user to enter the challenge string via an input device of the IHS, such as a keyboard, touch screen, touch pad, microphone, biometric scanner, etc. Additional text command(s) may be displayed to prompt the user to grant permission(s) for one or more application access request(s) in step 320.

In step 330, a boot service 107 within boot firmware 108 may receive, via an input device of the IHS, a user response to the challenge string prompt and any permission(s) granted by the user. As noted above, the manner in which the user input is received in step 330 is generally dependent on the input device used to provide the user input. For example, if the user interacted with a keyboard to provide the user response and permission(s) in step 320, an I/O controller 120 coupled to the keyboard may forward the user response and permission(s) to the processing device 102 or controller 118 executing the boot service 107 in step 330.

In step 340, a runtime service 109 within boot firmware 108 may compare the user response to the challenge string received during the pre-boot phase (in step 330) to the challenge string included within an application token stored within the boot firmware (in step 310) to verify the physical presence of a user in step 342. If the physical presence of a user cannot be verified based on the comparison (NO branch of step 342), the boot firmware may notify or inform the application that user physical presence could not be verified (in step 345). Alternatively, the method may end after failing to verify user physical presence without notifying the application. If, on the other hand, user physical presence is verified based on the comparison (YES branch of step 342) the method may continue to step 350.

In step 350, a runtime service 109 within boot firmware 108 may generate at least one boot firmware token. In some embodiments, the boot firmware token(s) generated in step 350 may be stored within the boot firmware. In one example, the boot firmware token(s) may be stored in computer readable memory 106 via a UEFI variable write service. In some embodiments, more than one boot firmware token may be generated (an optionally stored) and stored in step 350 if more than one unique application token was stored in step 310 and user physical presence is verified in steps 340/342. While the boot firmware token(s) generated in step 350 may include substantially any information or aggregation of information, the boot firmware token(s) generated in step 350 of FIG. 3 may include at least the permission(s) granted by the user during the pre-boot phase (in step 330). The boot firmware token(s) generated in step 350 may also include one or more additional pieces of information, as described above. Once generated, the boot firmware token(s) may be provided to the application(s) and used to open a secure communication tunnel between the boot firmware and the application(s) in step 360.

In some embodiments, it may not be necessary to store the boot firmware token(s) generated in step 350 in the boot firmware. In one example, the boot firmware may generate a random number, sign the random number using a private key, and send this signed boot firmware token to an application. Although the application cannot decrypt the signed boot firmware token, the application may store the signed boot firmware token and, on every operation, send the signed boot firmware token to the boot firmware for decryption.

In step 370, each application may generate a physical presence (PP) bind token that represents a physical presence binding operation between the boot firmware and the application. As noted above, each PP bind token generated in step 370 may include at least a subset of the information included within a unique application token generated in step 300 and a corresponding boot firmware token generated in step 350 and provided to the application. In the embodiment of FIG. 3, a PP bind token may include at least the permission(s) granted by the user during the pre-boot phase (in step 330) for one or more application access requests made by the application. The PP bind token generated in step 370 may also include one or more additional pieces of information, as set forth above. After a PP bind token is generated, it can be provided to the boot firmware and used as a unique physical presence binding handle between the boot firmware and the application.

In step 380, a runtime service 109 within boot firmware 108 may verify a PP bind token and check the permission(s) included within the PP bind token. The PP bind token may be verified as set forth above. Once the PP bind token is verified, a unique trust relationship is established between the boot firmware and the application providing the PP bind token. In step 390, a runtime service 109 within boot firmware 108 may allow or perform the application access(es) for the permission(s) granted by the user and included within the PP bind token.

The methods shown in FIGS. 2 and 3 improve upon conventional physical presence verification methods in a number of different ways. For example, the methods shown in FIGS. 2 and 3 provide secure verification of user physical presence by interacting with the user (in steps 220/320) and receiving user input (in steps 230/330) during a pre-boot phase of the boot firmware. As such, the methods disclosed herein provide verification of user physical presence with the highest possible confidence, since the pre-boot environment cannot be spoofed, is chained to the root of trust of the platform (the reset vector) and has the smallest amount of code running in the Trusted Computing Base. By verifying user physical presence during the pre-boot phase, before the OS is loaded and running, the disclosed methods avoid problems associated with conventional methods that rely on the operating system to verify user physical presence. Unlike conventional OS-level verification methods, remote attackers cannot imitate the physical presence of a user in the disclosed methods by exploiting OS and AD vulnerabilities.

In addition, the methods disclosed herein may be used to establish a unique trust relationship between the boot firmware and one or more individual applications based on the secure verification of user physical presence. Unlike conventional TPM-level verification methods, the unique trust relationship established by the methods disclosed herein persists during OS runtime until, e.g., the user logs out, the IHS enters a sleep state or reboots, or the physical presence of a user can no longer be verified. Furthermore, the unique trust relationship established between the boot firmware and each individual application may include separate permissions for accessing one or more computing resources of, or information stored within, an information handling system. This level of granularity is not provided by any known method.

The methods disclosed herein also allow cryptographic flexibility in establishing trust between the boot firmware and the individual application(s). As noted above, for example, some embodiments of the disclosed methods may exchange one or more keys (such as, e.g., an application public key and a boot firmware public key) between the application(s) and the boot firmware to establish trust. The key exchange may be implemented using substantially any known method of exchanging cryptographic keys between two parties (e.g., Diffie-Hellman, RSA, etc.). In other embodiments, the disclosed methods may derive one or more keys from a secret value shared between two parties using, for example, a key derivative function (KDF). In some embodiments, KDF may be used to derive one or more keys (e.g., from the random number or challenge string included within the application token) and/or format one or more keys into a symmetric key that can be encrypted (using, e.g., an advanced encryption standard, AES). The cryptographic technique(s) used to establish trust between the boot firmware and the application(s) may be chosen depending on performance and security requirements.

The methods disclosed herein and illustrated in FIGS. 2 and 3 are computer implemented methods performed, at least in part, by execution of program instructions contained within boot firmware 108, OS 112 and/or applications 114 of IHS 100. Unlike conventional information handling systems, the computer implemented methods disclosed herein improve the way in which IHS 100 functions, at the very least, by providing a secure method of verifying user physical presence that cannot be spoofed or imitated, and by establishing a unique trust relationship between the boot firmware and one or more individual applications that: (a) persists during OS runtime until user physical presence can no longer be verified, and (b) optionally includes separate permissions for application access. A skilled artisan having benefit of this disclosure may recognize other ways in which the computer implemented methods described herein may be used to improve the functioning of an information handling system, such as IHS 100.

It will be understood that one or more of the tasks, functions, or methodologies described herein may be implemented, for example, as firmware or as a computer program of instructions, which are embodied in a non-transitory tangible computer readable medium and executed by one or more processing devices. The computer program of instructions may generally include an ordered listing of executable instructions for implementing logical functions within the IHS, or within a component thereof. The executable instructions may include a plurality of code segments operable to instruct components of the information handling system to perform the methodologies disclosed herein. It will also be understood that one or more steps of the present methodologies may be employed in one or more code segments of a computer program. For example, a code segment executed by the information handling system may include one or more steps of the disclosed methodologies.

It will be understood that one or more processing devices may be configured to execute or otherwise be programmed with software, firmware, logic, and/or other program instructions, which are stored within one or more non-transitory tangible computer-readable mediums to perform the operations, tasks, functions, or actions described herein for the disclosed embodiments. The one or more processing devices may include, e.g., a central processing unit (CPU), controller, microcontroller, processor, microprocessor, field programmable gate array (FPGA), application specific integrated circuit (ASIC), or other suitable processing device. The one or more non-transitory tangible computer-readable mediums may include, e.g., data storage devices, flash memories, random update memories, read only memories, programmable memory devices, reprogrammable storage devices, hard drives, floppy disks, DVDs, CD-ROMs, and/or any other tangible data storage mediums.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed information handling systems and methods may be utilized in various combinations and/or independently. Thus, the present disclosure is not limited to only those combinations shown herein, but rather may include other combinations.

What is claimed is:

1. An information handling system (IHS), comprising:
a computer readable storage medium storing an operating system (OS) and at least one application;
a computer readable memory storing boot firmware including boot services and runtime services;
at least one processing device coupled to the computer readable storage medium and to the computer readable memory, wherein the at least one processing device is configured to execute:
a first set of program instructions included within the boot services of the boot firmware to interact with a user of the IHS and receive user input via an input device of the IHS during a pre-boot phase of the boot firmware, wherein the pre-boot phase begins when the IHS is booted and ends when the OS is loaded and running; and
a second set of program instructions included within the runtime services of the boot firmware to verify a physical presence of the user during OS runtime, wherein the verification of the physical presence of the user is based on at least a subset of the user input received during the pre-boot phase.

2. The information handling system as recited in claim 1, wherein the user input is selected from a group including: a key press on a keyboard or a touch screen, a swipe across the touch screen, a click/scroll on a mouse, a string of one or more characters entered on the keyboard or the touch screen, and a challenge string entered on the keyboard or the touch screen.

3. The information handling system as recited in claim 1, wherein the first set of program instructions are executed by the at least one processing device during the pre-boot phase to display a text command on a display screen of the IHS requesting the user to enter the user input via the input device of the IHS.

4. The information handling system as recited in claim 3, wherein the second set of program instructions executed by the at least one processing device during OS runtime is configured to verify the physical presence of the user if the user input received during the pre-boot phase matches user input requested in the text command.

5. An information handling system (IHS), comprising:
a computer readable storage medium storing an operating system (OS) and at least one application;
a computer readable memory storing boot firmware including boot services and runtime services;
at least one processing device coupled to the computer readable storage medium and to the computer readable memory, wherein the at least one processing device is configure to execute:
a first set of program instructions included within the boot services of the boot firmware to interact with a user of the IHS and receive user input via an input device of the IHS during a pre-boot phase of the boot firmware; and
a second set of program instructions included within the runtime services of the boot firmware to verify a physical presence of the user during OS runtime, wherein the verification of the physical presence of the user is based on at least a subset of the user input received during the pre-boot phase;

wherein the at least one application includes a third set of program instructions, which is executed by the at least one processing device during OS runtime to:
generate an application token unique to that application; and
provide the application token to the boot firmware.

6. The information handling system as recited in claim 5, wherein the application token includes one or more of the following:
one or more keys associated with the at least one application;
a plain text or hash of a challenge string displayed to the user of the IHS;
a random number generated by the at least one application;
a random number generated by the boot firmware and forwarded to the at least one application; and
one or more access requests associated with the application.

7. The information handling system as recited in claim 5, wherein the runtime services of the boot firmware include a fourth set of program instructions, which is executed by the at least one processing device during OS runtime to generate a boot firmware token if the physical presence of the user is verified.

8. The information handling system as recited in claim 7, wherein the boot firmware token includes one or more of the following:
one or more keys associated with the boot firmware;
a random number generated by the boot firmware;
a random number generated by the at least one application; and
a status of permissions granted and/or denied for one or more access requests associated with the application.

9. The information handling system as recited in claim 7, wherein the at least one application includes a fifth set of program instructions, which is executed by the at least one processing device during OS runtime to:
receive the boot firmware token if the physical presence of the user is verified;
open a secure communication tunnel between the boot firmware and the at least one application;
generate a physical presence (PP) bind token including at least a subset of information included within the application token and the boot firmware token; and
provide the PP bind token to the boot firmware.

10. The information handling system as recited in claim 9, wherein the runtime services of the boot firmware include a sixth set of program instructions, which is executed by the at least one processing device during OS runtime to establish a trust relationship between the boot firmware and the at least one application using the PP bind token.

11. A method for generating a trust relationship between boot firmware and at least one application stored within an information handling system (IHS), the method comprising:
providing an application token unique to the at least one application to the boot firmware;
storing the application token;
subsequently rebooting the IHS to enter a pre-boot phase of the boot firmware, wherein during the pre-boot phase the method further comprises:
prompting the user to provide user input; and
receiving the user input via an input device of the IHS; and
verifying a physical presence of the user based on at least a subset of the user input received during the pre-boot phase.

12. The method as recited in claim 11, wherein prior to providing the application token, the method further comprises generating the application token, wherein the application token includes at least one application access request and a challenge string that was previously displayed to the user.

13. The method as recited in claim 12, wherein said verifying includes comparing the received user input to the challenge string included within the application token to verify the physical presence of the user.

14. The method as recited in claim 12, wherein said prompting the user to provide user input and said receiving user input via an input device of the IHS respectively comprise:
prompting the user to provide the challenge string that was previously displayed to the user and grant permission for the at least one application access request included within the application token; and
receive a user response to the challenge string and any permissions granted by the user.

15. The method as recited in claim 11, further comprising generating a boot firmware token if the physical presence of the user is verified.

16. The method as recited in claim 15, further comprising opening a secure communication tunnel between the boot firmware and the at least one application.

17. The method as recited in claim 15, further comprising generating a physical presence (PP) bind token including at least a subset of information included within the application token and the boot firmware token.

18. The method as recited in claim 17, further comprising establishing a trust relationship between the boot firmware and the at least one application using the PP bind token.

19. The method as recited in claim 17, wherein the PP bind token includes any permissions granted by the user.

20. The method as recited in claim 19, further comprising performing application accesses per the permissions included within the PP bind token.

* * * * *